(12) United States Patent
Zhou et al.

(10) Patent No.: US 12,279,243 B2
(45) Date of Patent: Apr. 15, 2025

(54) ASSOCIATION OF CHANNEL REFERENCE SIGNALS WITH A COMMON BEAM TRANSMISSION CONFIGURATION INDICATOR

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/646,392

(22) Filed: Dec. 29, 2021

(65) Prior Publication Data

US 2022/0225314 A1    Jul. 14, 2022

Related U.S. Application Data

(60) Provisional application No. 63/135,384, filed on Jan. 8, 2021.

(51) Int. Cl.
*H04W 72/044*    (2023.01)
*H04L 5/00*    (2006.01)

(52) U.S. Cl.
CPC ......... *H04W 72/046* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2021/0185647 A1* | 6/2021 | Rahman | H04L 5/0091 |
| 2022/0022180 A1* | 1/2022 | Rahman | H04L 5/0048 |
| 2022/0217695 A1* | 7/2022 | Liou | H04B 7/0695 |
| 2023/0033141 A1* | 2/2023 | Matsumura | H04W 16/28 |
| 2023/0171771 A1* | 6/2023 | Guo | H04W 16/28 370/329 |
| 2023/0239125 A1* | 7/2023 | Yi | H04L 5/0096 370/329 |
| 2023/0300851 A1* | 9/2023 | Zhou | H04L 5/0053 370/329 |
| 2023/0328755 A1* | 10/2023 | Guo | H04B 7/06968 370/329 |
| 2023/0379902 A1* | 11/2023 | Matsumura | H04W 16/28 |
| 2023/0396375 A1* | 12/2023 | Muruganathan | H04L 5/0023 |

* cited by examiner

*Primary Examiner* — Anh Vu H Ly
(74) *Attorney, Agent, or Firm* — QUALCOMM Incorporated

(57) ABSTRACT

Various aspects of the present disclosure generally relate to wireless communication. In some aspects, a user equipment (UE) may receive a transmission configuration indicator (TCI) identifying a TCI state. The UE may associate the TCI state with one or more channels or reference signals based at least in part on a configured association. The UE may communicate using the one or more channels or reference signals based at least in part on associating the TCI state with the one or more channels or reference signals. Numerous other aspects are described.

30 Claims, 7 Drawing Sheets

ASSOCIATION OF CHANNEL REFERENCE SIGNALS WITH A COMMON BEAM TRANSMISSION CONFIGURATION INDICATOR

CROSS-REFERENCE TO RELATED APPLICATION

This patent application claims priority to U.S. Provisional Patent Application No. 63/135,384, filed on Jan. 8, 2021, entitled "ASSOCIATION OF CHANNEL REFERENCE SIGNALS WITH A COMMON BEAM TRANSMISSION CONFIGURATION INDICATOR," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for association of channel reference signals with a common beam transmission configuration indicator.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the memory and the one or more processors configured to: receive a transmission configuration indicator (TCI) identifying a TCI state; associate the TCI state with one or more channels or reference signals based at least in part on a configured association; and communicate using the one or more channels or reference signals based at least in part on associating the TCI state with the one or more channels or reference signals.

In some aspects, a method of wireless communication performed by a UE includes receiving a TCI identifying a TCI state; associating the TCI state with one or more channels or reference signals based at least in part on a configured association; and communicating using the one or more channels or reference signals based at least in part on associating the TCI state with the one or more channels or reference signals.

In some aspects, a non-transitory computer-readable medium storing a set of instructions for wireless communication includes one or more instructions that, when executed by one or more processors of a UE, cause the UE to: receive a TCI identifying a TCI state; associate the TCI state with one or more channels or reference signals based at least in part on a configured association; and communicate using the one or more channels or reference signals based at least in part on associating the TCI state with the one or more channels or reference signals.

In some aspects, an apparatus for wireless communication includes means for receiving a TCI identifying a TCI state; and means for associating the TCI state with one or more channels or reference signals based at least in part on a configured association; and means for communicating using the one or more channels or reference signals based at least in part on associating the TCI state with the one or more channels or reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
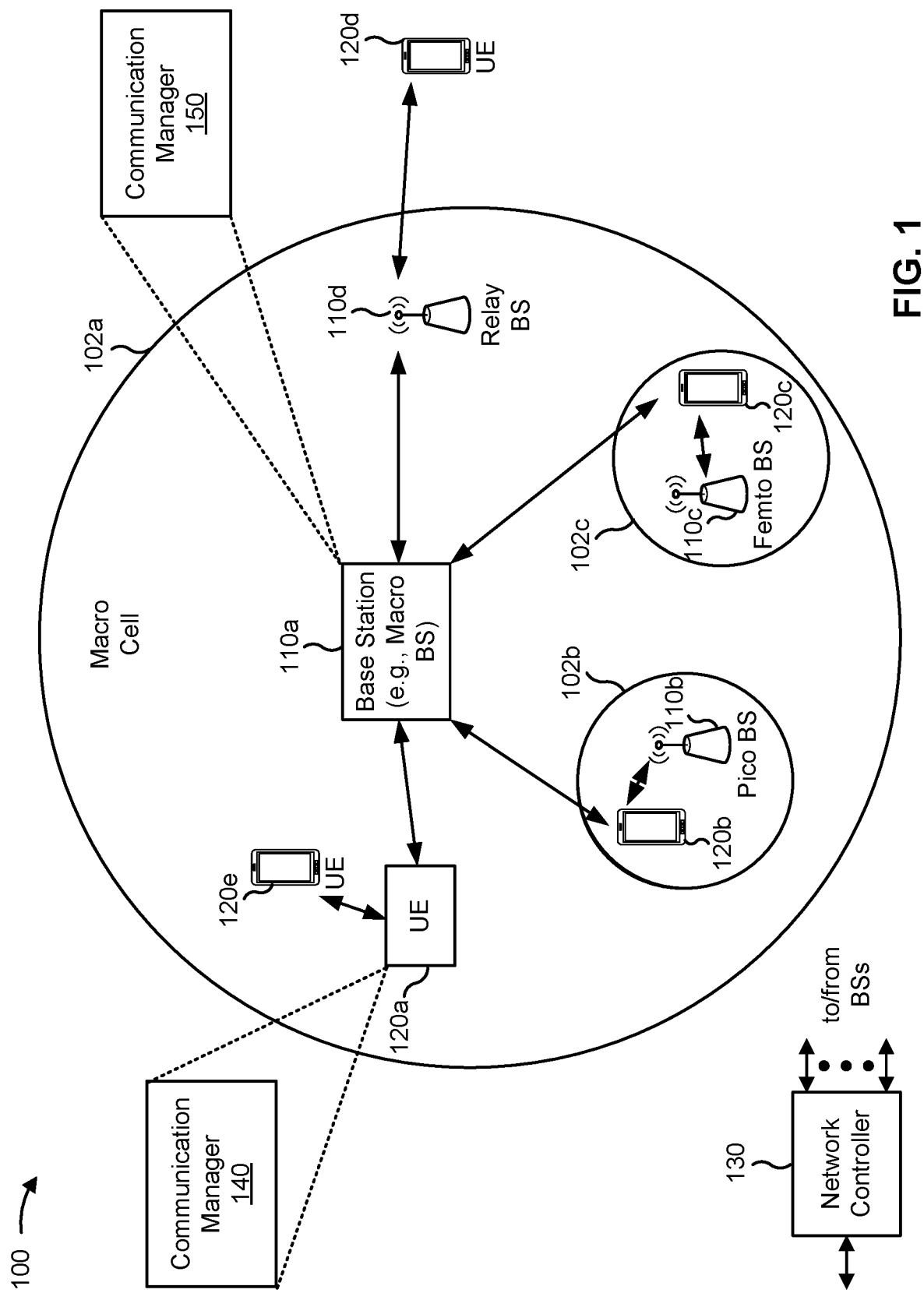
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a transmission configuration indicator (TCI) identifying a TCI state; associate the TCI state with one or more channels or reference signals based at least in part on a configured association; and communicate using the one or more channels or reference signals based at least in part on associating the TCI state with the one or more channels or reference signals. Additionally, or alternatively, the communication manager 140 may perform one or more other operations described herein.

In some aspects, the base station 110 may include a communication manager 150. As described in more detail elsewhere herein, the communication manager 150 may transmit a TCI identifying a TCI state; and communicate using one or more channels or reference signals associated with the TCI state. Additionally, or alternatively, the communication manager 150 may perform one or more operations described herein.

As indicated above, FIG. 1 is provided as an example. Other examples may differ from what is described with regard to FIG. 1.

Figure 2:
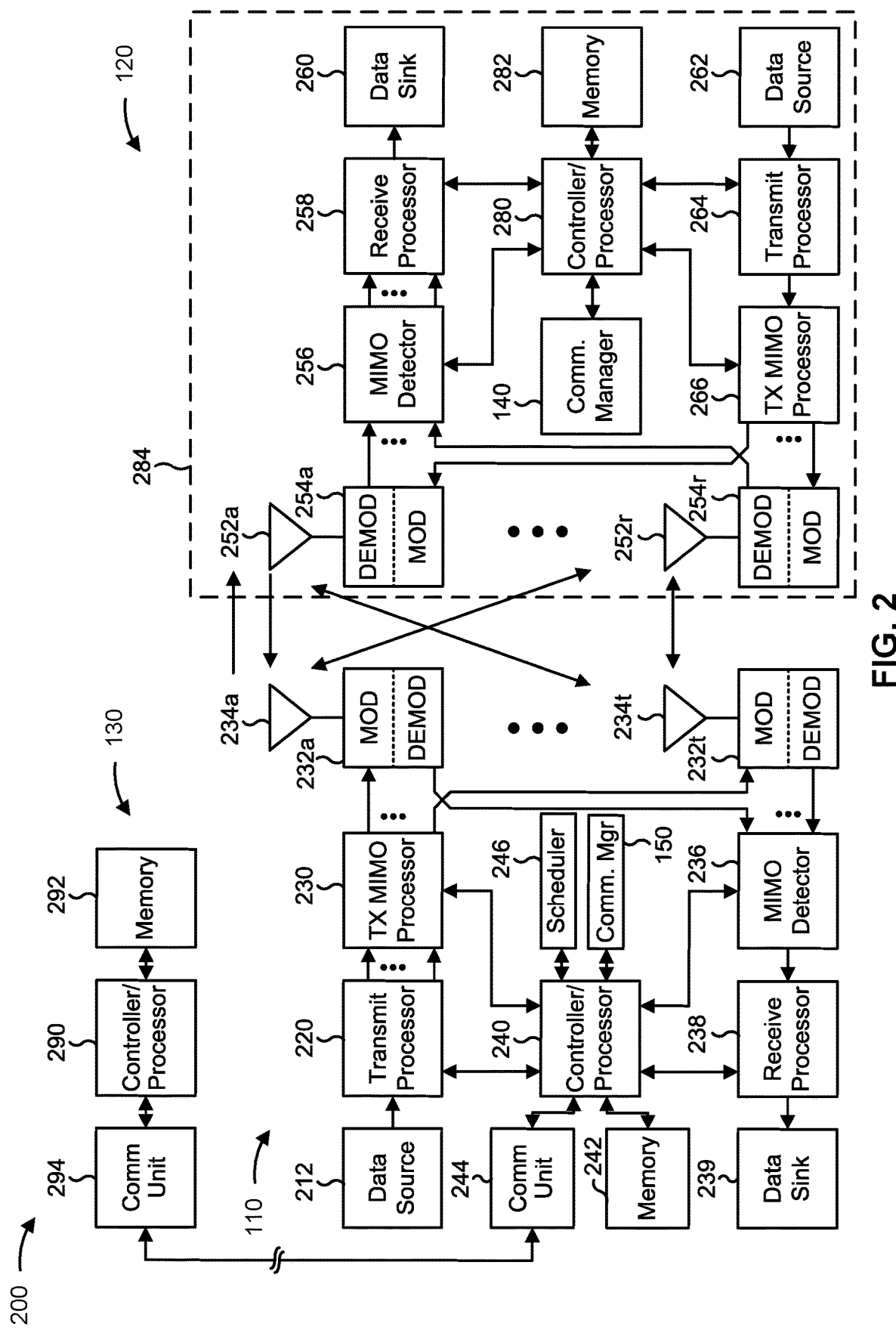
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with configuration of an association between channels or reference signals and a TCI, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, the UE 120 includes means for receiving a TCI identifying a TCI state; means for associating the TCI state with one or more channels or reference signals based at least in part on a configured association; and/or means for communicating using the one or more channels or reference signals based at least in part on associating the TCI state with the one or more channels or reference signals. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a TCI identifying a TCI state; and/or means for communicating using one or more channels or reference signals associated with the TCI state. The means for the base station 110 to perform operations described herein may include, for example, one or more of the communication manager 150, antenna 234, modem 232, MIMO detector 236, receive processor 238, transmit processor 220, TX MIMO processor 230, controller/processor 240, or memory 242.

As indicated above, FIG. 2 is provided as an example. Other examples may differ from what is described with regard to FIG. 2.

Figure 3:
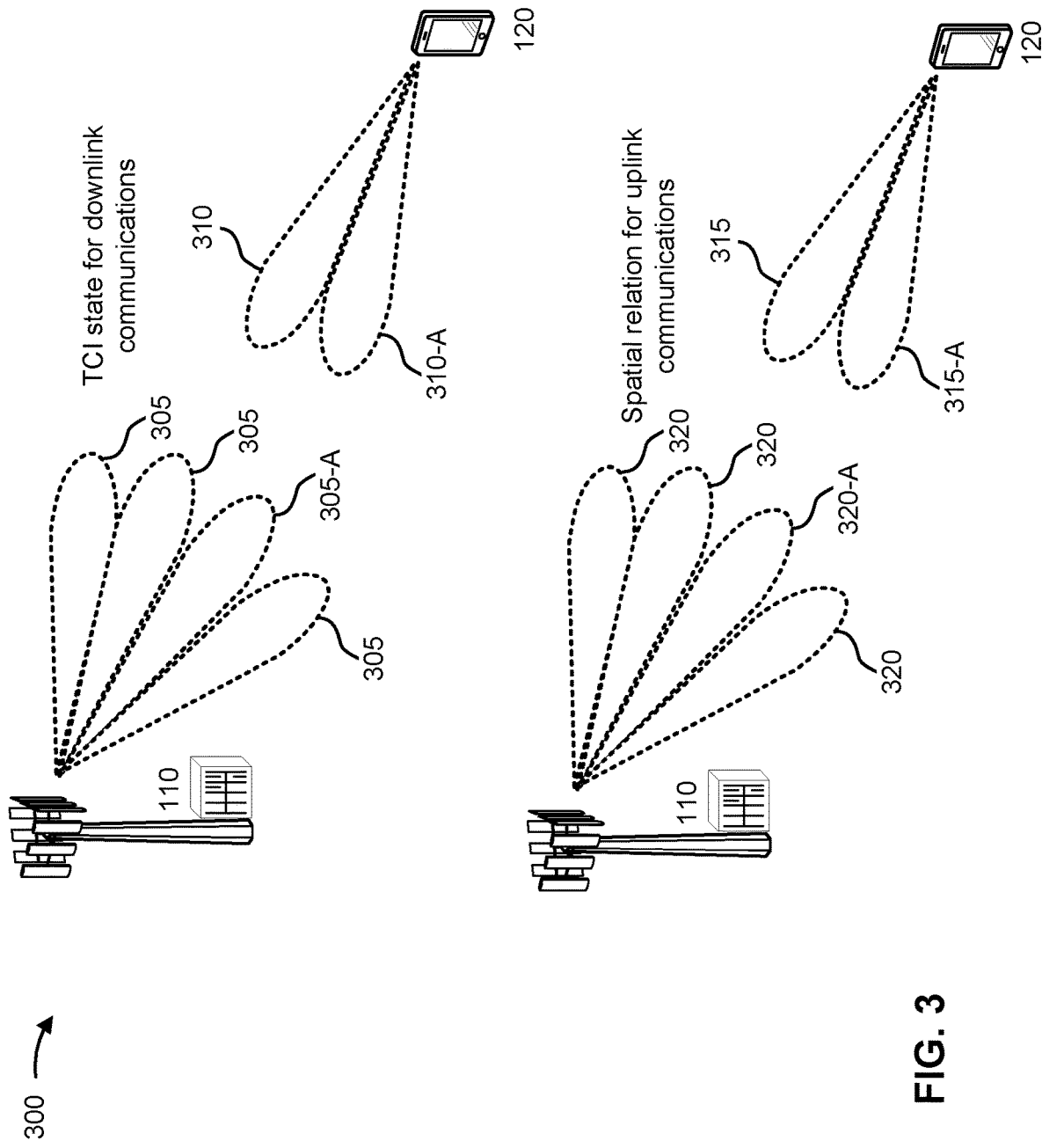
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beam-formed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

As described above, UEs and BSs may use indications of relationships between beam parameters to enable configuration of communication. Examples of such relationships and indications thereof include QCL properties, spatial relationships, or TCI states, among other examples. 3GPP has discussed adding a new group of TCI states for 3GPP Release 17 and in, for example, "Moderator summary #2 for multi-beam enhancement" (3GPP Tdoc R1-2009499). A first new TCI state, of the new group of TCI states, is a joint downlink and uplink (DL/UL) common TCI state to indicate a common beam for at least one downlink channel or reference signal and at least one uplink channel or reference signal. A second new TCI state, of the new group of TCI states, is a separate common TCI state to indicate a common beam for at least two downlink channels or reference signals. A third new TCI state, of the new group of TCI states, is a separate uplink common TCI state to indicate a common beam for at least two uplink channels or reference signals.

Some aspects described herein enable configuration of an association between channels or reference signals with a common beam identified by a TCI, such as a TCI corresponding to one of the aforementioned new TCI states. For example, a UE may receive information explicitly or implicitly indicating at least one set of channels or reference signals to which a particular type of TCI state is to be applied. In this way, the UE may determine a configuration for a set of channels or reference signals when receiving a TCI, such as a TCI associated with one of the aforementioned new TCI states. Although some aspects are described herein in terms of a particular set of TCI states, other TCI states are contemplated.

Figure 4:
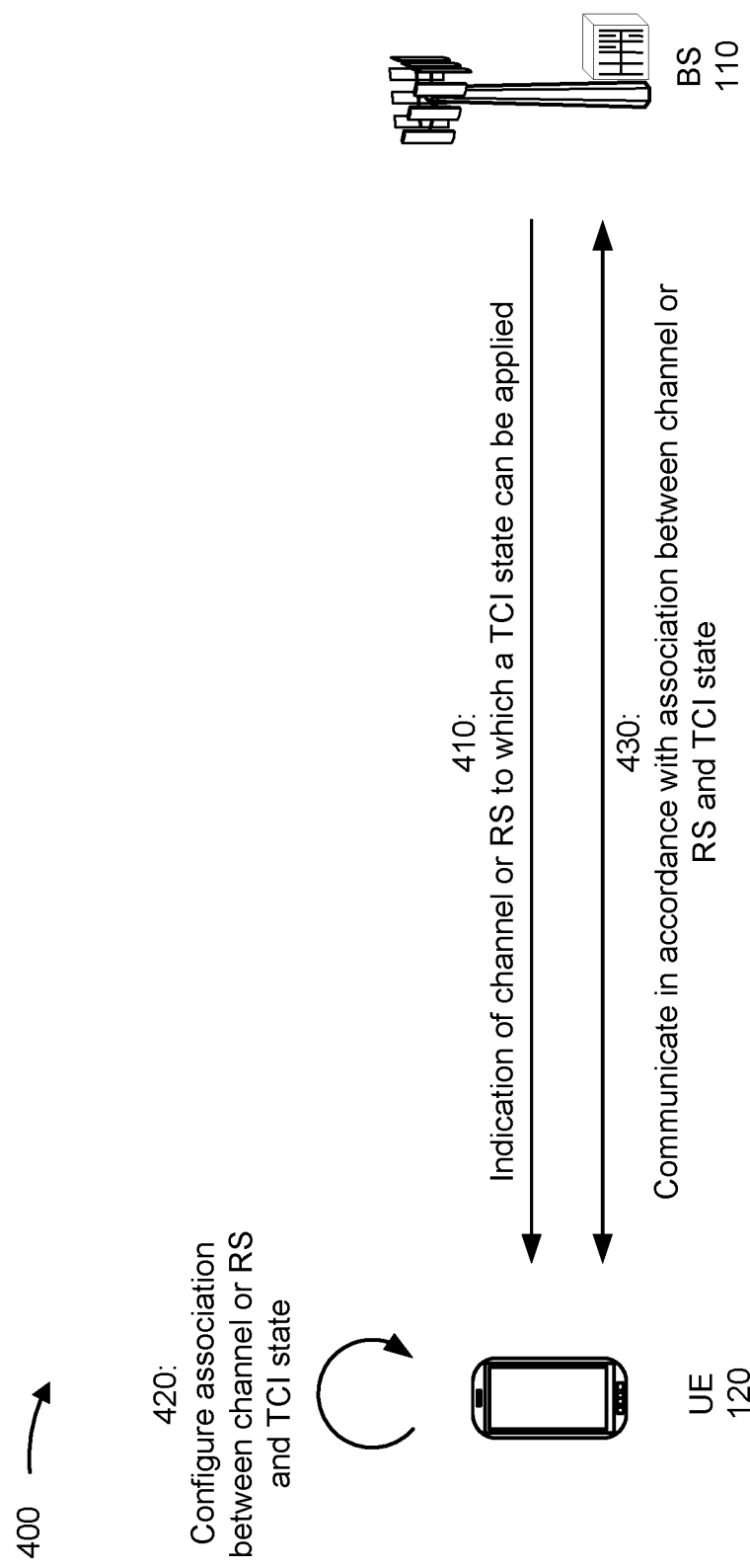
FIG. 4 is a diagram illustrating an example associated with configuration of an association between channels or reference signals and a transmission configuration indicator, in accordance with the present disclosure.

FIG. 4 is a diagram illustrating an example 400 associated with configuring an association of channel reference signals with a common beam transmission configuration indicator, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As further shown in FIG. 4, and by reference number 410, UE 120 may receive an explicit or implicit indication of a set of channels or reference signals to which a particular type of TCI state is to be applied. For example, UE 120 may receive signaling from base station 110, via a radio resource control (RRC) message, a medium access control (MAC) control element (CE), or a downlink control information (DCI) message, among other examples, to configure an association of channels or reference signals with, for example, a common beam type of TCI.

In some aspects, UE 120 may receive information indicating that the TCI state, to which the set of channels or reference signals is to be applied, is a particular type of TCI state. For example, the TCI state may include a first type of TCI state, termed a joint DL/UL common TCI state, that indicates a common beam (the same beam) for at least one downlink channel or reference signal and for at least one uplink channel or reference signal. Additionally, or alternatively, the TCI state may include a second type of TCI state, termed a separate downlink common TCI state, that indicates a common beam for at least two downlink channels or reference signals. Additionally, or alternatively, the TCI state may include a third type of TCI state, termed a separate uplink common TCI state, that indicates a common beam for at least two uplink channels or reference signals. Additionally, or alternatively, the TCI state may include a fourth type of TCI state, termed a separate downlink single channel or reference signal TCI state, that indicates a beam for a single downlink channel or reference signal. Additionally, or alternatively, the TCI state may include a fifth type of TCI state, termed a separate uplink single channel or reference signal TCI state, that indicates a beam for a single uplink channel or reference signal. Although some aspects are described in terms of a particular set of types of TCI states, aspects described herein may be used with other TCI states, QCL parameters, or spatial relations.

In some aspects, UE 120 may receive information indicating that the one or more channels or reference signals, that are to be associated with the TCI state, are a particular type of channels or reference signals. For example, the one or more channels or reference signals may include a UE-specific or non-UE-specific physical downlink control channel (PDCCH), physical downlink shared channel (PDSCH), physical uplink control channel (PUCCH), or physical uplink shared channel (PUSCH), among other examples. In some aspects, a type of scheduling of the one or more channels or reference signals may be based at least in part on a type of channel or reference signal. For example, UE 120 may receive dynamic scheduling (e.g., a DCI) or semi-static scheduling (e.g., configuration via RRC and activation via a DCI or MAC CE), among other examples, for a PDSCH, PUCCH, or PUSCH. When the channel is a PDSCH, scheduling offset between a DCI and the PDSCH may be greater than or equal to a beam switch latency threshold, in some cases, or less than the threshold in other cases. When the channel is a PDCCH, UE 120 may be configured to receive the PDCCH on all control resource sets (CORESETs) configured for UE 120 or on a subset of the CORESETs configured for UE 120.

Additionally, or alternatively, the one or more channels or reference signals may include a persistent, semi-persistent, or aperiodic reference signal, such as a channel state information (CSI) reference signal (RS) (CSI-RS) or a paging reference signal (PRS), among other examples. For example, UE 120 may receive a TCI identifying a beam for a CSI-RS for CSI measurement and reporting, beam measurement and reporting, or tracking reference signal (TRS) measurement, among other examples. As another example, UE 120 may receive a TCI identifying a beam for a sounding reference signal (SRS) for antenna switching, beam management, codebook-based PUSCH, or non-codebook-based PUSCH, among other examples. Additionally, or alternatively, the one or more channels or reference signals may include a synchronization signal block (SSB).

In some aspects, UE 120 may receive information identifying an explicit association of a set of channels or reference signals to which a type of TCI state is to be applied. For example, UE 120 may receive a dedicated information element (IE) that includes information identifying a set identifier (set ID) and a type of channel or reference signal in an identified set. In this case, UE 120 may associate each identified set with at least one TCI type based at least in part on the received signaling. For example, UE 120 may receive RRC signaling statically configuring an association between a TCI type and a channel or reference signal set. In some aspects, UE 120 may receive the information identifying the association between the TCI type and the channel or reference signal set within the IE that included the information identifying the channel or reference signal set (e.g., the IE that included the set ID and the type of channel or reference signals that were to be associated with the set ID). In some aspects, the IE may include information identifying a plurality of types of TCIs that are applicable to a particular set of channels or reference signals. For example, UE 120 may parse the IE to identify a list of TCIs and may associate each TCI of the list of TCIs with the set of channels or reference signals identified by the IE. In this case, when base station 110 identifies a TCI state of a particular type of TCI that UE 120 is to use, UE 120 may apply the TCI state to the set of channels or reference signals associated with the TCI type.

Additionally, or alternatively, UE 120 may receive information configuring the association between a TCI type and a channel or reference signal set separate from the dedicated IE that configured the channel or reference signal set and/or separate from a TCI state IE. For example, UE 120 may receive a first IE configuring the channel or reference signal set and a second IE identifying one or more channel or reference signal sets (e.g., one or more set IDs) that are to be associated with a particular TCI type. In this case, the second IE may be a dedicated, new IE or a portion of an existing IE. For example, UE 120 may receive a bandwidth part downlink or uplink IE associated with configuring a TCI state pool, and may use information included in the bandwidth part downlink or uplink IE to associate a set ID with a particular TCI type.

Additionally, or alternatively, UE 120 may receive a TCI state IE including information configuring the association between a TCI type and a channel or reference signal set. For example, UE 120 may receive a TCI state IE for a particular TCI type and the TCI state IE may include one or more set IDs to which the particular TCI type is to be associated. In this way, UE 120 may associate a TCI type with a plurality of set IDs rather than a single set ID as may occur when the association is configured using a dedicated IE or a separate IE.

In some aspects, UE 120 may receive a MAC CE or DCI dynamically configuring an association between a TCI type and a set of channels or reference signals. For example, UE 120 may receive a MAC CE or DCI that includes information identifying one or more set IDs (corresponding to one or more sets of channels or reference signals) for each TCI type or one or more TCI types for each set ID. In this case, each TCI type may be associated with a single set ID. Additionally, or alternatively, UE 120 may receive a MAC CE identifying one or more set IDs for each TCI state identifier (state ID) or one or more TCI state IDs for each set ID. In this case, each TCI state ID may be associated with a single set ID, but a plurality of TCI state IDs may correspond to a single TCI type, resulting in each TCI type being able to be associated with a plurality of set IDs.

In some aspects, UE 120 may receive information explicitly configuring an association between a TCI type and a set of channels or reference signals without receiving a dedicated IE. For example, UE 120 may receive RRC signaling statically configuring an association between a TCI type and a set of channels or reference signals. In this case, the association is identified outside of the TCI state IE (e.g., using a separate IE, which identifies a set of channels or reference signals corresponding to a TCI type, such as a new IE or an existing IE for another purpose) or inside of the TCI state IE. Additionally, or alternatively, UE 120 may receive a MAC CE or DCI dynamically configuring an association between a TCI type and a set of channels or reference signals without using a dedicated IE (as described above).

In some aspects, UE 120 may receive information implicitly configuring an association between a TCI type and a set of channels or reference signals. For example, BS 110 may transmit information identifying a TCI state or type that is to be applied to a particular channel or reference signal, and UE 120 may apply the TCI state or type to each channel or reference signal in a configured set of channels or reference signals that includes the particular channel or reference signal. In other words, if a set ID applies to a first channel, second channel, and third channel, and UE 120 receives signaling indicating that a TCI type is to apply to the second channel, UE 120 may apply the TCI type to each of the first channel, the second channel, and the third channel based at least in part on the first channel, the second channel, and the third channel having a common set ID. In contrast, if the particular channel or reference signal is not included in any configured set of channels or reference signals, UE 120 may apply the TCI type or state only to the particular channel or reference signal.

Additionally, or alternatively, when operating in a multiple transmit-receive-point (TRP) deployment, UE 120 may determine an implicit association between a TCI type and a set of channels or reference signals, which may be scheduled or activated using CORESETs associated with a TRP, based at least in part on information identifying the TRP. For example, base station 110 may transmit information indicating that a TCI state or type is to be applied to a TRP identified by a particular TRP identifier (TRP ID) and UE 120 may apply the TCI state or type to each channel or reference signal associated with the TRP ID. In other words, a TRP may have a group of channels or reference signals associated with the TRP, and UE 120 may apply the TCI type to each channel or reference signal of the group of channels or reference signals. Similarly, base station 110 may transmit information identifying a TCI state or type that is to be applied to a channel or reference signal that is configured to be scheduled or activated by a CORESET associated with a particular TRP ID, and UE 120 may apply the TCI state or type to each channel or reference signal associated with the particular TRP ID. For example, when a TRP is associated with a first channel and a second channel and base station 110 indicates that a TCI type is to be applied to the first channel, which is scheduled or activated by a CORESET associated with the TRP, UE 120 may apply the TCI type to both the first channel and the second channel as well.

Additionally, or alternatively, UE 120 may determine an implicit association between a TCI type and one or more channels or reference signals based at least in part on a fixed association rule, which may be defined by a specification, a standard, a firmware rule, or a software rule, among other examples. For example, UE 120 may be configured with a rule specifying that each separate downlink common TCI state is applicable to a UE-specific PDCCH, a UE-specific PDSCH, a CSI-RS for CSI measurement or reporting, and a CSI-RS for TRS measurement. In this case, when UE 120 receives signaling configuring the TCI state for the UE-specific PDCCH, UE 120 may apply the TCI state to the UE-specific PDSCH, the CSI-RS for CSI measurement or reporting, and the CSI-RS for TRS measurement. As another example, UE 120 may be configured with a rule that a separate uplink common TCI state is applicable to a UE-specific PUCCH, a UE-specific PUSCH, an SRS for antenna switching, an SRS for codebook based PUSCH, and an SRS for non-codebook based PUSCH. As another example, UE 120 may be configured with a rule specifying that a joint downlink and uplink common TCI state is applicable to each of the aforementioned channels or reference signals to which the separate downlink common TCI state and the separate uplink common TCI state are applicable. In some cases, a TCI state may be applicable to both a UE-dedicated PDSCH or PDCCH and a non-UE dedicated PDCCH or PDSCH that is configured by RRC signaling. Similarly, an SRS for beam management, antenna switching, codebook based transmission, or non-codebook based transmission may share a TCI state with a dynamic grant or configured grant PUSCH configured via RRC.

In some aspects, UE 120 may be configured to use a plurality of different techniques for implicit association of TCI types to channels or reference signals. For example, UE 120 may be configured for implicit association via an indication of a TCI state or type, indication of a TRP, or application of a fixed rule, among other examples. In some aspects, UE 120 may receive explicit signaling indicating which implicit association technique to use. For example, UE 120 may receive RRC signaling including a flag or other indicator identifying an option for implicit association. Additionally, or alternatively, UE 120 may implicitly determine the option for implicit association based at least in part on a configuration of an RRC IE. For example, when the IE is configured to identify a channel or reference signal, UE 120 may determine that UE 120 is to perform implicit association by indication of a TCI state or type. Similarly, when the IE is configured to include a plurality of TRP IDs, UE 120 may determine that to perform implicit association by indication of a TRP. Other configurations for implicitly identifying a type of implicit association are contemplated.

As further shown in FIG. 4, and by reference number 420, UE 120 may configure an association between a channel or reference signal and a TCI state. For example, as described above, UE 120 may configure an association based on an explicit indication or an implicit indication, among other examples. In this case, as shown by reference number 430, UE 120 may communicate in accordance with the association between the channel or reference signal and the TCI state. For example, when UE 120 receives a TCI, UE 120 may configure a set of channels or reference signals based at least in part on the TCI state and the association between the set of channels or reference signals and the TCI state. In this case, when UE 120 communicates with base station 110 (e.g., on an uplink or downlink using at least one of the set of channels or reference signals), UE 120 may use, for example, a beam identified based at least in part on the TCI state.

As indicated above, FIG. 4 is provided as an example. Other examples may differ from what is described with respect to FIG. 4.

Figure 5:
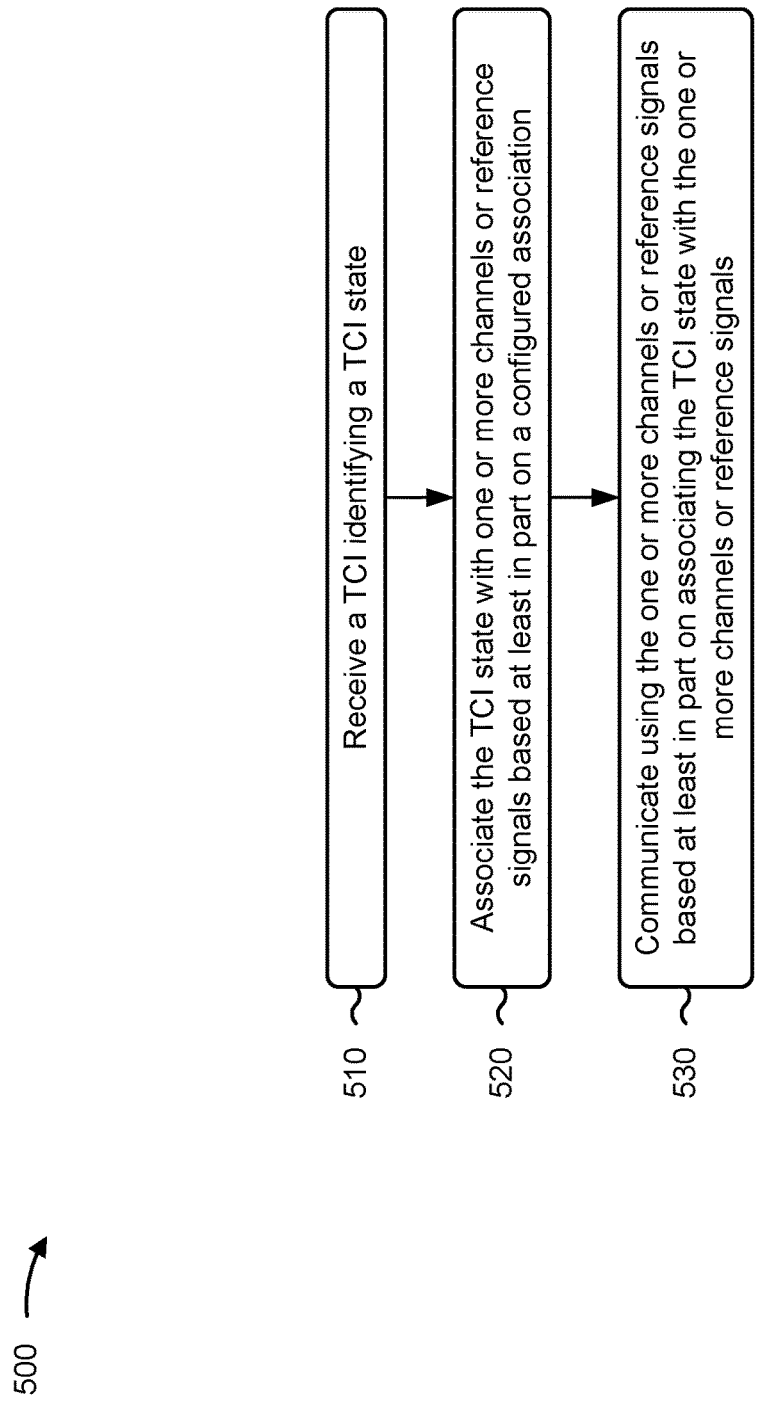
FIG. 5 is a diagram illustrating an example process associated with configuration of an association between channels or reference signals and a transmission configuration indicator, in accordance with the present disclosure.

FIG. 5 is a diagram illustrating an example process 500 performed, for example, by a UE, in accordance with the present disclosure. Example process 500 is an example where the UE (e.g., UE 120) performs operations associated with association of channel reference signals with a common beam transmission configuration indicator.

As shown in FIG. 5, in some aspects, process 500 may include receiving a TCI identifying a TCI state (block 510). For example, the UE (e.g., using reception component 602, depicted in FIG. 6) may receive a TCI identifying a TCI state, as described above.

As further shown in FIG. 5, in some aspects, process 500 may include associating the TCI state with one or more channels or reference signals based at least in part on a configured association (block 520). For example, the UE (e.g., using association component 608, depicted in FIG. 6) may associate the TCI state with one or more channels or reference signals based at least in part on a configured association, as described above.

As further shown in FIG. 5, in some aspects, process 500 may include communicating using the one or more channels or reference signals based at least in part on associating the TCI state with the one or more channels or reference signals (block 530). For example, the UE (e.g., using reception component 602 and/or transmission component 604, depicted in FIG. 6) may communicate using the one or more channels or reference signals based at least in part on associating the TCI state with the one or more channels or reference signals, as described above.

Process 500 may include additional aspects, such as any single aspect or any combination of aspects described below and/or in connection with one or more other processes described elsewhere herein.

In a first aspect, the TCI state is associated with a particular type, and the type is one of a first type identifying a common beam for a downlink channel or reference signal and an uplink channel or reference signal, a second type identifying a common beam for a plurality of downlink channels or reference signals, a third type identifying a common beam for a plurality of uplink channels or reference signals, a fourth type identifying a beam for a single downlink channel or reference signal, or a fifth type identifying a beam for a single uplink channel or reference signal.

In a second aspect, alone or in combination with the first aspect, the one or more channels or reference signals include at least one of a physical downlink control channel, a physical downlink shared channel, a physical uplink control channel, a physical uplink shared channel, a synchronization signal block, a channel state information reference signal, a paging reference signal, or a sounding reference signal.

In a third aspect, alone or in combination with one or more of the first and second aspects, the configured association is an explicit association.

In a fourth aspect, alone or in combination with one or more of the first through third aspects, process 500 includes receiving radio resource control signaling including a dedicated information element identifying the one or more channels or reference signals, and determining the configured association based at least in part on the at least one of the one or more channels or reference signals on the dedicated information element.

In a fifth aspect, alone or in combination with one or more of the first through fourth aspects, the information element is included in the one or more channels or reference signals.

In a sixth aspect, alone or in combination with one or more of the first through fifth aspects, the information element is included in another one or more channels or reference signals that is different from the one or more channels or reference signals.

In a seventh aspect, alone or in combination with one or more of the first through sixth aspects, the information element is included in the TCI state.

In an eighth aspect, alone or in combination with one or more of the first through seventh aspects, the configured association corresponds to a TCI type or a TCI state.

In a ninth aspect, alone or in combination with one or more of the first through eighth aspects, process 500 includes receiving a medium access control (MAC) control element (CE) or downlink control information (DCI) including an information element identifying the one or more channels or reference signals, and determining the configured association based at least in part on the MAC CE or DCI.

In a tenth aspect, alone or in combination with one or more of the first through ninth aspects, the DCI includes information scheduling another transmission.

In an eleventh aspect, alone or in combination with one or more of the first through tenth aspects, process 500 includes receiving signaling including a non-dedicated information element associated with identifying the configured association, wherein the signaling is radio resource control signaling, medium access control control element signaling, or downlink control information signaling.

In a twelfth aspect, alone or in combination with one or more of the first through eleventh aspects, the non-dedicated information element is conveyed outside of a TCI state information element or inside of the TCI state information element.

In a thirteenth aspect, alone or in combination with one or more of the first through twelfth aspects, the configured association is an implicit association.

In a fourteenth aspect, alone or in combination with one or more of the first through thirteenth aspects, associating the TCI state with the one or more channels or reference signals comprises associating the TCI state with all channels or reference signals that include a channel or reference signal to which the TCI state is applied.

In a fifteenth aspect, alone or in combination with one or more of the first through fourteenth aspects, associating the TCI state with the one or more channels or reference signals comprises determining that a channel or reference signal to which the TCI state is applied is not included in a set of channels or reference signals, and associating the TCI state with only the channel or reference signal based at least in part on determining that the channel or reference signal is not included in a set of channels or reference signals.

In a sixteenth aspect, alone or in combination with one or more of the first through fifteenth aspects, associating the TCI state with the one or more channels or reference signals comprises associating the TCI state with all channels or reference signals associated with a transmit receive point (TRP) to which the TCI state is applied.

In a seventeenth aspect, alone or in combination with one or more of the first through sixteenth aspects, associating the TCI state with the one or more channels or reference signals comprises associating the TCI state with all channels or reference signals scheduled or activated by a control resource set associated with a TRP to which the TCI state is applied.

In an eighteenth aspect, alone or in combination with one or more of the first through seventeenth aspects, the implicit association is fixed in a standard.

In a nineteenth aspect, alone or in combination with one or more of the first through eighteenth aspects, process 500 includes receiving signaling identifying a setting for the implicit association, and associating the TCI state with the one or more channels or reference signals comprises associating the TCI state with the one or more channels or reference signals based at least in part on the setting for the TCI state.

In a twentieth aspect, alone or in combination with one or more of the first through nineteenth aspects, process 500 includes determining a configuration of a radio resource control information element, and determining a setting for the implicit association based at least in part on the configuration of the radio resource control information element.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
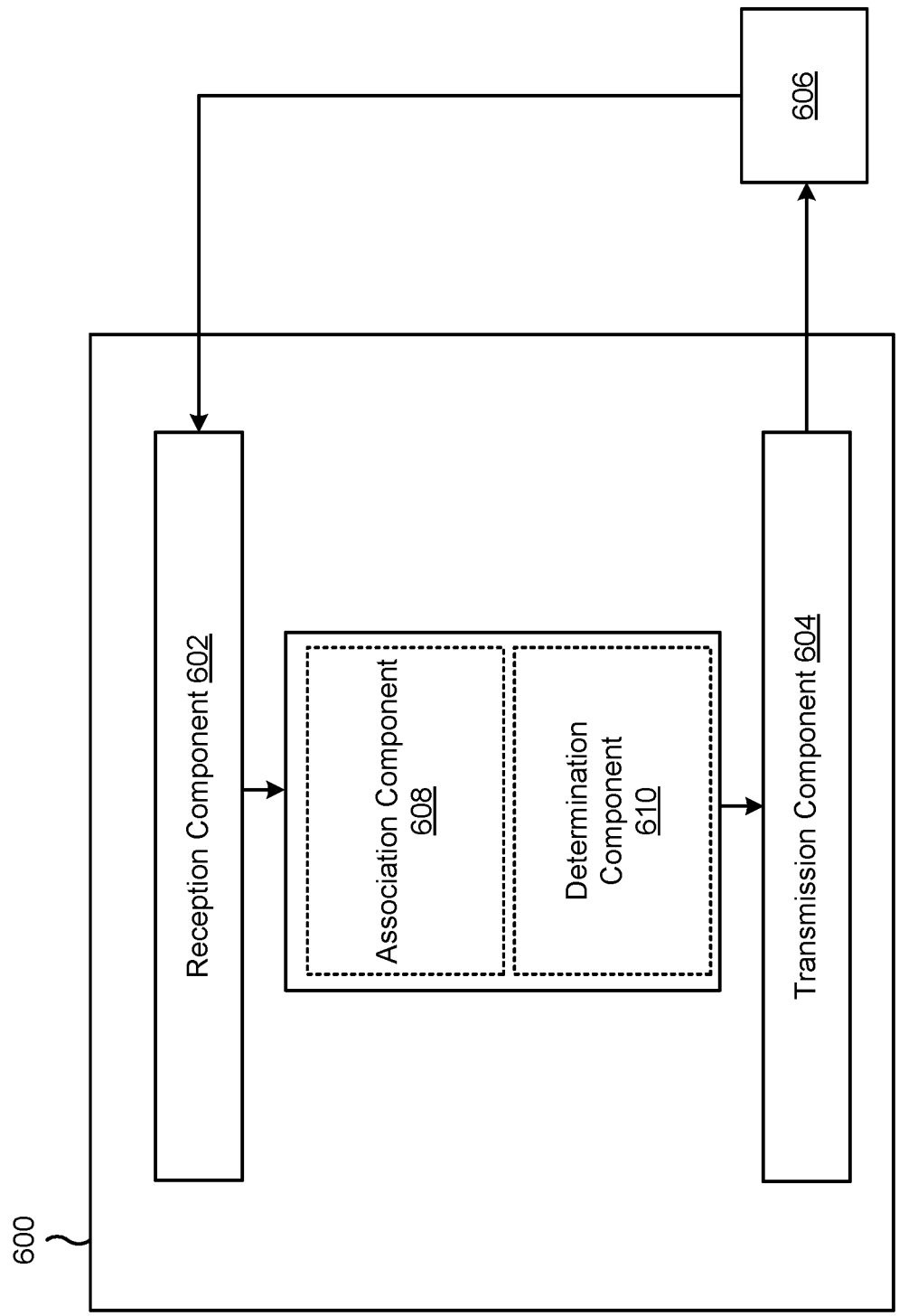
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of an association component 608 or a determination component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive a TCI identifying a TCI state. The association component 608 may associate the TCI state with one or more channels or reference signals based at least in part on a configured association. The reception component 602 or the transmission component 604 may communicate using the one or more channels or reference signals based at least in part on associating the TCI state with the one or more channels or reference signals.

The reception component 602 may receive radio resource control signaling including a dedicated information element identifying the one or more channels or reference signals.

The determination component 610 may determine the configured association based at least in part on the at least one of the one or more channels or reference signals on the dedicated information element.

The reception component 602 may receive a MAC CE or DCI including an information element identifying the one or more channels or reference signals.

The determination component 610 may determine the configured association based at least in part on the MAC CE or DCI.

The reception component 602 may receive signaling including a non-dedicated information element associated with identifying the configured association, wherein the signaling is radio resource control signaling, MAC CE signaling, or DCI signaling.

The reception component 602 may receive signaling identifying a setting for the implicit association.

The determination component 610 may determine a configuration of a radio resource control information element.

The determination component 610 may determine a setting for the implicit association based at least in part on the configuration of the radio resource control information element.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
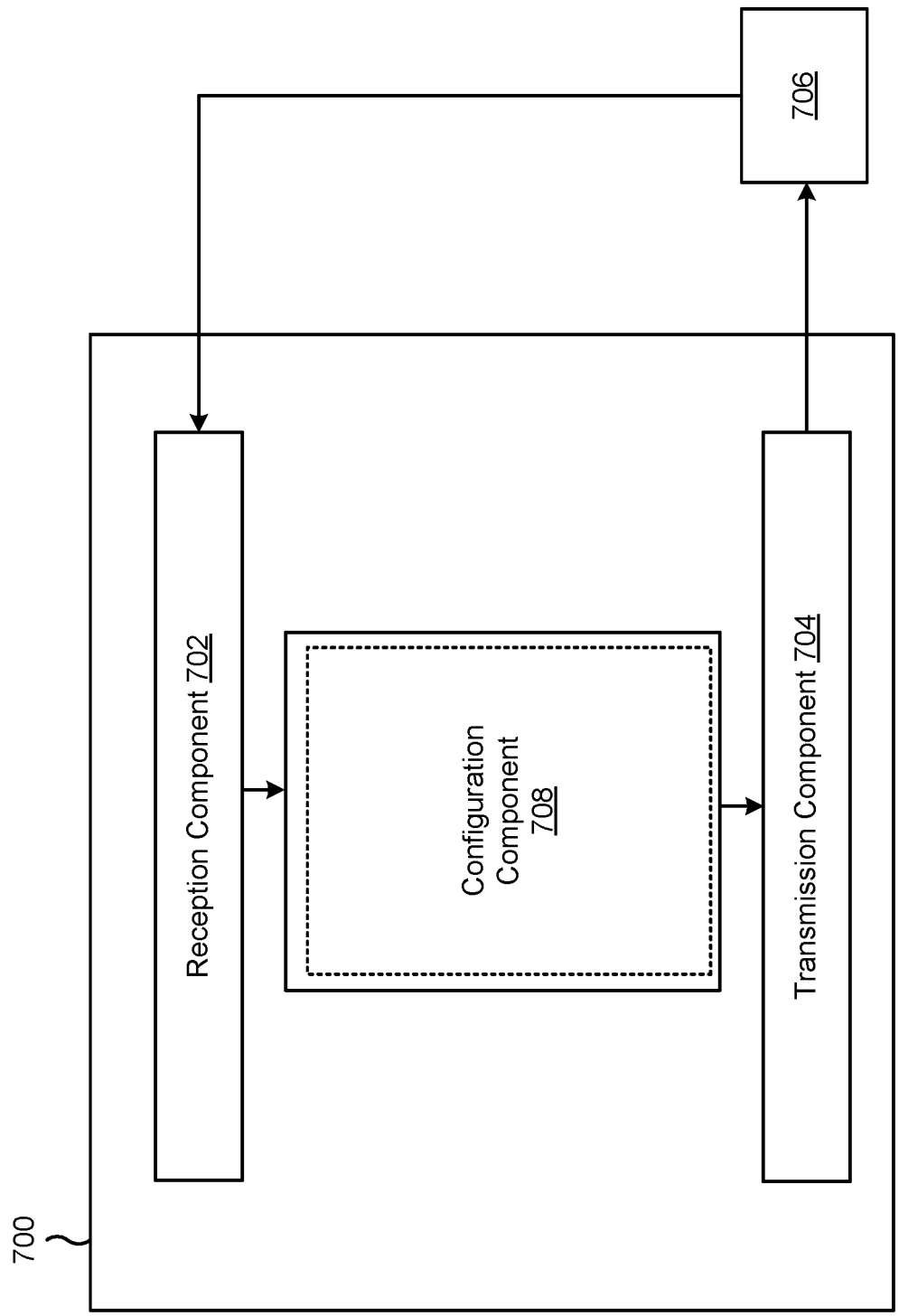

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a configuration component 708, among other examples.

In some aspects, the apparatus 700 may be configured to perform one or more operations described herein in connection with FIG. 4. Additionally, or alternatively, the apparatus 700 may be configured to perform one or more processes described herein. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The configuration component 708 may configure the apparatus 706 with an association between a TCI type and one or more channels or reference signals, as described above.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a user equipment (UE), comprising: receiving a transmission configuration indicator (TCI) identifying a TCI state; associating the TCI state with one or more channels or reference signals based at least in part on a configured association; and communicating using the one or more channels or reference signals based at least in part on associating the TCI state with the one or more channels or reference signals.

Aspect 2: The method of aspect 1, wherein the TCI state is associated with a particular type, and wherein the type is one of: a first type identifying a common beam for a downlink channel or reference signal and an uplink channel or reference signal, a second type identifying a common beam for a plurality of downlink channels or reference signals, a third type identifying a common beam for a plurality of uplink channels or reference signals, a fourth type identifying a beam for a single downlink channel or reference signal, or a fifth type identifying a beam for a single uplink channel or reference signal.

Aspect 3: The method of any of aspects 1 to 2, wherein the one or more channels or reference signals include at least one of: a physical downlink control channel, a physical downlink shared channel, a physical uplink control channel, a physical uplink shared channel, a synchronization signal block, a channel state information reference signal, a paging reference signal, or a sounding reference signal.

Aspect 4: The method of any of aspects 1 to 3, wherein the configured association is an explicit association.

Aspect 5: The method of aspect 4, further comprising: receiving radio resource control signaling including a dedicated information element identifying the one or more channels or reference signals; and determining the configured association based at least in part on the at least one of the one or more channels or reference signals on the dedicated information element.

Aspect 6: The method of aspect 5, wherein the information element is included in the one or more channels or reference signals.

Aspect 7: The method of any of aspects 5 to 6, wherein the information element is included in another one or more channels or reference signals that is different from the one or more channels or reference signals.

Aspect 8: The method of any of aspects 5 to 7, wherein the information element is included in the TCI state.

Aspect 9: The method of any of aspects 1 to 8, wherein the configured association corresponds to a TCI type or a TCI state.

Aspect 10: The method of any of aspects 1 to 9, further comprising: receiving a medium access control (MAC) control element (CE) or downlink control information (DCI) including an information element identifying the one or more channels or reference signals; and determining the configured association based at least in part on the MAC CE or DCI.

Aspect 11: The method of aspect 10, wherein the DCI includes information scheduling another transmission.

Aspect 12: The method of any of aspects 1 to 11, further comprising: receiving signaling including a non-dedicated information element associated with identifying the configured association, wherein the signaling is radio resource control signaling, medium access control control element signaling, or downlink control information signaling.

Aspect 13: The method of aspect 12, wherein the non-dedicated information element is conveyed outside of a TCI state information element or inside of the TCI state information element.

Aspect 14: The method of any of aspects 1 to 13, wherein the configured association is an implicit association.

Aspect 15: The method of aspect 14, wherein associating the TCI state with the one or more channels or reference signals comprises: associating the TCI state with all channels or reference signals that include a channel or reference signal to which the TCI state is applied.

Aspect 16: The method of any of aspects 14 to 15, wherein associating the TCI state with the one or more channels or reference signals comprises: determining that a channel or reference signal to which the TCI state is applied is not included in a set of channels or reference signals; and associating the TCI state with only the channel or reference signal based at least in part on determining that the channel or reference signal is not included in a set of channels or reference signals.

Aspect 17: The method of any of aspects 14 to 16, wherein associating the TCI state with the one or more channels or reference signals comprises: associating the TCI state with all channels or reference signals associated with a transmit receive point (TRP) to which the TCI state is applied.

Aspect 18: The method of any of aspects 14 to 17, wherein associating the TCI state with the one or more channels or reference signals comprises: associating the TCI state with all channels or reference signals scheduled or activated by a control resource set associated with a transmit receive point (TRP) to which the TCI state is applied.

Aspect 19: The method of any of aspects 14 to 18, wherein the implicit association is fixed in a standard.

Aspect 20: The method of any of aspects 14 to 19, further comprising: receiving signaling identifying a setting for the implicit association; and wherein associating the TCI state with the one or more channels or reference signals comprises: associating the TCI state with the one or more channels or reference signals based at least in part on the setting for the TCI state, wherein associating the TCI state with the one or more channels or reference signals comprises: associating the TCI state with the one or more channels or reference signals based at least in part on the setting for the TCI state.

Aspect 21: The method of any of aspects 1 to 20, further comprising: determining a configuration of a radio resource control information element; and determining a setting for the implicit association based at least in part on the configuration of the radio resource control information element.

Aspect 22: An apparatus for wireless communication at a device, comprising a processor; memory coupled with the processor; and instructions stored in the memory and executable by the processor to cause the apparatus to perform the method of one or more aspects of aspects 1-21.

Aspect 23: A device for wireless communication, comprising a memory and one or more processors coupled to the memory, the memory and the one or more processors configured to perform the method of one or more aspects of aspects 1-21.

Aspect 24: An apparatus for wireless communication, comprising at least one means for performing the method of one or more aspects of aspects 1-21.

Aspect 25: A non-transitory computer-readable medium storing code for wireless communication, the code comprising instructions executable by a processor to perform the method of one or more aspects of aspects 1-21.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive a transmission configuration indicator (TCI) identifying a TCI state;
      receive an indication that identifies an association between a TCI type of the TCI state, a type of channel, and a type of reference signal,
      wherein the TCI type of the TCI state is a TCI type from a set that includes:
         a first TCI type that indicates a common beam for downlink signaling and uplink signaling,
         a second TCI type that indicates a common beam for multiple downlink channels or reference signals, and
         a third TCI type that indicates a common beam for multiple uplink channels or reference signals; and
      communicate using the type of channel and the type of reference signal based at least in part on the association between the TCI state, the type of channel, and the type of reference signal.

2. The UE of claim 1, wherein the TCI type of the TCI state includes one of:
   the first TCI type,
   the second TCI type,
   the third TCI type,
   a fourth TCI type identifying a beam for a single downlink channel or reference signal, or
   a fifth TCI type identifying a beam for a single uplink channel or reference signal.

3. The UE of claim 1, wherein the type of channel includes at least one of: a physical downlink control channel, a physical downlink shared channel, a physical uplink control channel, or a physical uplink shared channel, and wherein the type of reference signal includes at least one of: a synchronization signal block, a channel state information reference signal, a paging reference signal, or a sounding reference signal.

4. The UE of claim 1, wherein the association is an explicit association.

5. The UE of claim 4, wherein the one or more processors are further configured to:
   receive radio resource control signaling including a dedicated information element identifying the type of channel and the type of reference signal; and
   determine the association based at least in part on the dedicated information element.

6. The UE of claim 5, wherein the one or more processors, when determining the association, are to:
   determine the association based at least in part on another information element identifying the association.

7. The UE of claim 5, wherein the dedicated information element is included in an information element of the one or more channels or reference signals.

8. The UE of claim 5, wherein the dedicated information element is included in a configuration of the TCI state.

9. The UE of claim 1, wherein the one or more processors are further configured to:
   receive a medium access control (MAC) control element (CE) or downlink control information (DCI) including an information element identifying the type of channel and the type of reference signal; and
   determine the association based at least in part on the MAC CE or DCI.

10. The UE of claim 9, wherein the DCI includes information scheduling another transmission.

11. The UE of claim 1, wherein the one or more processors are further configured to:
    receive signaling including a non-dedicated information element associated with identifying the association, wherein the signaling is radio resource control signaling, medium access control control element signaling, or downlink control information signaling.

12. The UE of claim 11, wherein the non-dedicated information element is conveyed outside of a TCI state information element or inside of the TCI state information element.

13. The UE of claim 1, wherein the association is an implicit association.

14. The UE of claim 13, wherein the one or more processors are further configured to:
    associate the TCI type of the TCI state with all channels or reference signals that include a channel or reference signal to which the TCI type of the TCI state is applied.

15. The UE of claim 13, wherein the one or more processors are further configured to:
    associate the TCI type of the TCI state with only a channel or a reference signal based at least in part on determining that the channel or reference signal is not included in a set of channels or reference signals.

16. The UE of claim 13, wherein the one or more processors are further configured to:
    associate the TCI type of the TCI state with all channels or reference signals associated with a transmit receive point (TRP) to which the TCI type of the TCI state is applied.

17. The UE of claim 13, wherein the one or more processors are further configured to:
  associate the TCI type of the TCI state with all channels or reference signals scheduled or activated by a control resource set associated with a transmit receive point (TRP) to which the TCI type of the TCI state is applied.

18. The UE of claim 13, wherein the implicit association is fixed in a standard.

19. The UE of claim 13, wherein the one or more processors are further configured to:
  receive signaling identifying a setting for the implicit association; and
  wherein the one or more processors are further configured to:
    associate the TCI type of the TCI state with the one or more channels or reference signals based at least in part on the setting for the TCI type of the TCI state.

20. The UE of claim 13, wherein the one or more processors are further configured to:
  determine a configuration of a radio resource control information element; and
  determine a setting for the implicit association based at least in part on the configuration of the radio resource control information element.

21. A method of wireless communication performed by a user equipment (UE), comprising:
  receiving a transmission configuration indicator (TCI) identifying a TCI state;
  receiving an indication that identifies an association between a TCI type of the TCI state, a type of channel, and a type of reference signal,
  wherein the TCI type of the TCI state is a TCI type from a set that includes:
    a first TCI type that indicates a common beam for downlink signaling and uplink signaling,
    a second TCI type that indicates a common beam for multiple downlink channels or reference signals, and
    a third TCI type that indicates a common beam for multiple uplink channels or reference signals; and
  communicating using the type of channel and the type of reference signal based at least in part on the association between the TCI state, the type of channel, and the type of reference signal.

22. The method of claim 21, wherein the TCI type of the TCI state includes one of:
  the first TCI type,
  the second TCI type,
  the third TCI type,
  a fourth TCI type identifying a beam for a single downlink channel or reference signal, or
  a fifth TCI type identifying a beam for a single uplink channel or reference signal.

23. The method of claim 21, wherein the type of channel includes at least one of: a physical downlink control channel, a physical downlink shared channel, a physical uplink control channel, or a physical uplink shared channel, and wherein the type of reference signal includes at least one of: a synchronization signal block, a channel state information reference signal, a paging reference signal, or a sounding reference signal.

24. The method of claim 21, wherein the association is an explicit association.

25. The method of claim 24, further comprising:
  receiving radio resource control signaling including a dedicated information element identifying the type of channel and the type of reference signal; and
  determining the association based at least in part on the dedicated information element.

26. The method of claim 25, wherein determining the association comprises:
  determining the association based at least in part on another information element identifying the association.

27. A non-transitory computer-readable medium storing a set of instructions for wireless communication, the set of instructions comprising:
  one or more instructions that, when executed by one or more processors of a user equipment (UE), cause the UE to:
    receive a transmission configuration indicator (TCI) identifying a TCI state;
    receive an indication that identifies an association between a TCI type of the TCI state, a type of channel, and a type of reference signal,
    wherein the TCI type of the TCI state is a TCI type from a set that includes:
      a first TCI type that indicates a common beam for downlink signaling and uplink signaling,
      a second TCI type that indicates a common beam for multiple downlink channels or reference signals, and
      a third TCI type that indicates a common beam for multiple uplink channels or reference signals; and
    communicate using the type of channel and the type of reference signal based at least in part on the association between the TCI state, the type of channel, and the type of reference signal.

28. An apparatus for wireless communication, comprising:
  means for receiving a transmission configuration indicator (TCI) identifying a TCI state;
  means for receiving an indication that identifies an association between a TCI type of the TCI state, a type of channel, and a type of reference signal,
  wherein the TCI type of the TCI state is a TCI type from a set that includes:
    a first TCI type that indicates a common beam for downlink signaling and uplink signaling,
    a second TCI type that indicates a common beam for multiple downlink channels or reference signals, and
    a third TCI type that indicates a common beam for multiple uplink channels or reference signals; and
  means for communicating using the type of channel and the type of reference signal based at least in part on the association between the TCI state, the type of channel, and the type of reference signal.

29. The non-transitory computer-readable medium of claim 27, wherein the TCI type of the TCI state includes one of:
  the first TCI type,
  the second TCI type,
  the third TCI type,
  a fourth TCI type identifying a beam for a single downlink channel or reference signal, or
  a fifth TCI type identifying a beam for a single uplink channel or reference signal.

30. The non-transitory computer-readable medium of claim 27, wherein the type of channel includes at least one of: a physical downlink control channel, a physical downlink shared channel, a physical uplink control channel, or a physical uplink shared channel, and wherein the type of reference signal includes at least one of: a synchronization signal block, a channel state information reference signal, a paging reference signal, or a sounding reference signal.

\* \* \* \* \*